(12) United States Patent
Krampe

(10) Patent No.: US 6,192,588 B1
(45) Date of Patent: Feb. 27, 2001

(54) WIRE STRIPPING TOOL

(76) Inventor: Franz Krampe, Bergstrasse 5, D-59387 Ascheberg (DE)

( * ) Notice: Subject to any disclaimer, the term of this patent is extended or adjusted under 35 U.S.C. 154(b) by 0 days.

(21) Appl. No.: 08/945,762

(22) PCT Filed: Feb. 18, 1997

(86) PCT No.: PCT/EP97/00753

§ 371 Date: Jan. 29, 1998

§ 102(e) Date: Jan. 29, 1998

(87) PCT Pub. No.: WO97/32369

PCT Pub. Date: Sep. 4, 1997

(30) Foreign Application Priority Data

Mar. 1, 1996 (DE) .............................................. 196 07 949

(51) Int. Cl.[7] .................................................. H01R 43/05
(52) U.S. Cl. .............................................. 30/90.6; 30/91.2
(58) Field of Search ................................... 30/90.6, 90.7, 30/90.8, 91.2; 83/597, 549; 81/9.43, 9.4, 9.41, 9.42, 9.64

(56) References Cited

U.S. PATENT DOCUMENTS

| | | | | |
|---|---|---|---|---|
| 2,370,733 | * | 3/1945 | Jones ...................................... | 30/91.2 |
| 2,704,000 | * | 3/1955 | Miller ..................................... | 30/90.6 |
| 3,182,532 | * | 5/1965 | Oehlerking ............................. | 81/9.41 |
| 3,212,369 | * | 10/1965 | Way ....................................... | 30/90.6 |
| 3,216,110 | * | 11/1965 | Stallings ................................ | 30/91.1 |
| 3,813,966 | * | 6/1974 | Knuth ..................................... | 30/91.1 |
| 4,228,707 | * | 10/1980 | Arlett ..................................... | 83/597 |
| 4,240,572 | * | 12/1980 | Mitsuhashi ............................. | 83/597 |
| 5,009,006 | * | 4/1991 | Sawyer et al. ......................... | 81/9.41 |
| 5,150,522 | * | 9/1992 | Gwo-Jiang ............................. | 30/91.2 |
| 5,163,350 | * | 11/1992 | Groswith, III et al. ............... | 83/549 |
| 5,435,029 | * | 7/1995 | Carlson, Jr. et al. ................... | 81/9.4 |

FOREIGN PATENT DOCUMENTS

WO 94/01906 * 7/1993 (DE) ................................. H02G/1/12

* cited by examiner

Primary Examiner—Kenneth E. Peterson
Assistant Examiner—Gyounghyun Bae
(74) Attorney, Agent, or Firm—Milde, Hoffberg & Macklin, LLP

(57) ABSTRACT

In order to give the device proposed for preparing electric wires and/or cables for installation a sensitive feel, it is designed with two outer grips (1,2) disposed opposite each other and at least one inner arm (3,4) mounted on one of the outer grips (1,2). A link element (50) holds the first outer grip (1) by a first bolt (6'), the second outer grip (2) by a second bolt (9') and the inner arm (3,4) by at least one additional bolt (7',8') located in the link element (50) between the first and second bolts (6',9'). A multiple joint (5) of this kind enables both of the outer grips (1,2) and their associated inner arms (3,4), together with their tool parts (11,12; 13,14; 15,16), to be pressed against each other and for the outer grips (1,2) to be moved different distances towards each other and also different distances with respect to the inner arm (3,4).

14 Claims, 4 Drawing Sheets

WIRE STRIPPING TOOL

BACKGROUND OF THE INVENTION

The present invention concerns a wire stripper comprising at least two legs fastened together at one end by a pivot like the legs of a pair of tweezers. The pivot is complex and comprises at least two pins accommodated in an intermediate component. There is one tool component at at least the other end.

A device of this genus is known from DE 42 21 500 C1. It comprises two legs fastened together like the legs of a pair of tweezers by a double articulation. Wire-cutting components are positioned at the free end of the legs remote from the articulation.

This device has been proven effective. Still, in order to remove the insulation from the wire, so much force must be applied to slide the insulation off with the legs squeezed together as to render the overall procedure difficult. Furthermore, thin wires can be torn apart.

Wire-stripping pliers are known from WO 90/10 323 A1. They comprise an upper and a lower leg, each of which merge at one end into a handle. The upper leg accommodates a holder that holds one wire-cutting component. The other wire-cutting component is mounted on the lower leg. There is a drawback to these pliers. The wire-cutter holder executes a translation when the handles are squeezed together, which makes it difficult to work with a fine touch.

There is accordingly a need for an improved device of the aforesaid genus that will allow reparation of electrical wires and cables with a fine touch during installation.

SUMMARY OF THE INVENTION

According to the invention, the legs are first and second outer legs secured to the intermediate component by first and second pins, one of outer legs accommodating a working leg which is secured by an additional pin between the first and second pins to form a complex articulation that allows the two outer legs to be squeezed together with the working legs inside and with their working components together.

The particular advantages of the present invention derive from the squeezed-together outer legs applying all the force necessary as they move toward each other. The working leg, articulated at the complex articulation between the outer legs, is accordingly "supported" in its execution of the same motion. The complex articulation is a triple articulation. Between one of the outer legs and the working leg, the distance between the pins associated with the outer legs and the pins associated with the working leg as part of a lever. It is accordingly possible to apply the forces needed while the working leg is moving with a fine touch and with exactness.

There are two possible types of working leg. It can be either an inner leg or an inner-leg piston.

If the working leg is an inner leg, it will have at least one guidance recess and travel along a guidance recess in the first outer leg (the upper leg). The inner leg and the first outer leg will accordingly act as one leg when both legs are held like the legs in a pair of tweezers and when the two outer legs are squeezed together. If on the other hand a sliding motion is executed, both legs will act as separate components. If only the inner leg does the work, the complex articulation can be a triple articulation.

This action is exploited when the tool components function like the wire-cutting components in a wire stripper. In this event, one wire-cutting component is mounted with a gripping jaw facing it on the opposing end of the inner leg, with a third pin extending through that end, and the other wire-cutting component with another gripping jaw facing it on the opposing end of the other outer leg. The inner leg will not, as it slides along with the adjacent outer legs, slide as far in relation to the second outer leg (the lower leg) as the (upper) outer first leg does in relation to it. The actual removal of the cylinder of insulation from the wire will be carried out by the (lower) second outer leg and the inner leg.

To ensure smooth relative motion on the part of the legs, the second leg accommodates a cog, part of which has a curved leg guidance surface.

The cog can engage a leg-guidance recess in the inner leg.

The inner leg can, in accordance with its intended function, be either an insulation-removal leg or an insulation slide-off leg. In this event the legs will differ in length by a specific increment, the insulation-removal leg being longer than the insulation slide-off leg. In this event, as the insulation-removal leg slides, the separated cylinder of insulation will entirely slide off the wire. In contrast, the insulation slide-off leg will slide the separated insulation along the wire and away from the point of incision without removing it. Since the separated cylinder of insulation remains on the wire, this approach is especially appropriate for strands. The section of cylinder remaining on the wire can be used to twist the strands for later connection. This method will protect the fingers more effectively than known methods can.

It will be of advantage for at least part of one leg-guidance opposing surface on the insulation slide-off leg to be beveled. This will allow effective application of the force-times-distance relationship to the displacement of the separated cylinder of insulation.

If the working leg is an inner-leg piston, it can be secured in the second outer leg by a guidance piston. The guidance piston will effectively travel forward in a slot or similar structure inside the outer leg as the two outer legs slide relative to each other. If only the inner-leg piston is involved, the complex articulation can be a triple articulation.

If on the other hand an appropriately designed inner leg is employed along with the inner-leg piston, the complex articulation will be a quadruple articulation. A quadruple articulation can also act like a triple articulation if an outer leg is appropriately combined with an inner leg or inner-leg piston.

The inner-leg piston can accommodate at least one crimping plunger. The squeezing plunger can enter at least one crimping bushing accommodated in one wall of the second outer leg. The result is a crimping tool that can be used to crimp bushings inserted over the free ends of the stripped wire. The lever reduction ensures that both the crimping and insulation stripping can be executed both forcefully and with a fine touch.

The crimping bushings are components of a guidance rod that bridges the walls of the second outer leg. The guidance rod extends through guidance recesses in the inner-leg piston. The crimping bushings are engineered such that the guidance rod is a solid cylinder. A bore is bored in one end of the rod and then slit to allow the particular crimping plunger to force bushings inserted in the round recess against the wire.

There is a moving surface on the opposing free end, which a fourth pin extends through, of the inner-leg piston that moves against a separating knife in one wall of the second leg.

Since the moving surface can be forced forward by the inner-leg piston, it constitutes in conjunction with the separating knife a line-or-cable cutting mechanism. The inner-leg piston, secured by the fourth pin, moves forward, like the inner leg, slower than the two outer legs in all its operations. The fourth pin between the pins associated with the first and second outer legs allows a fine touch and forceful motion of the inner-leg piston.

To facilitate movement of the two outer legs with respect to each other, these legs are provided with gripping elevations and gripping depressions for the thumb on one side and for the fingers on the other.

BRIEF DESCRIPTION OF THE DRAWING

One embodiment of the present invention will now be specified with reference to the accompanying drawing, wherein.

DETAILED DESCRIPTION OF THE PREFERRED EMBODIMENT

Figure 1:
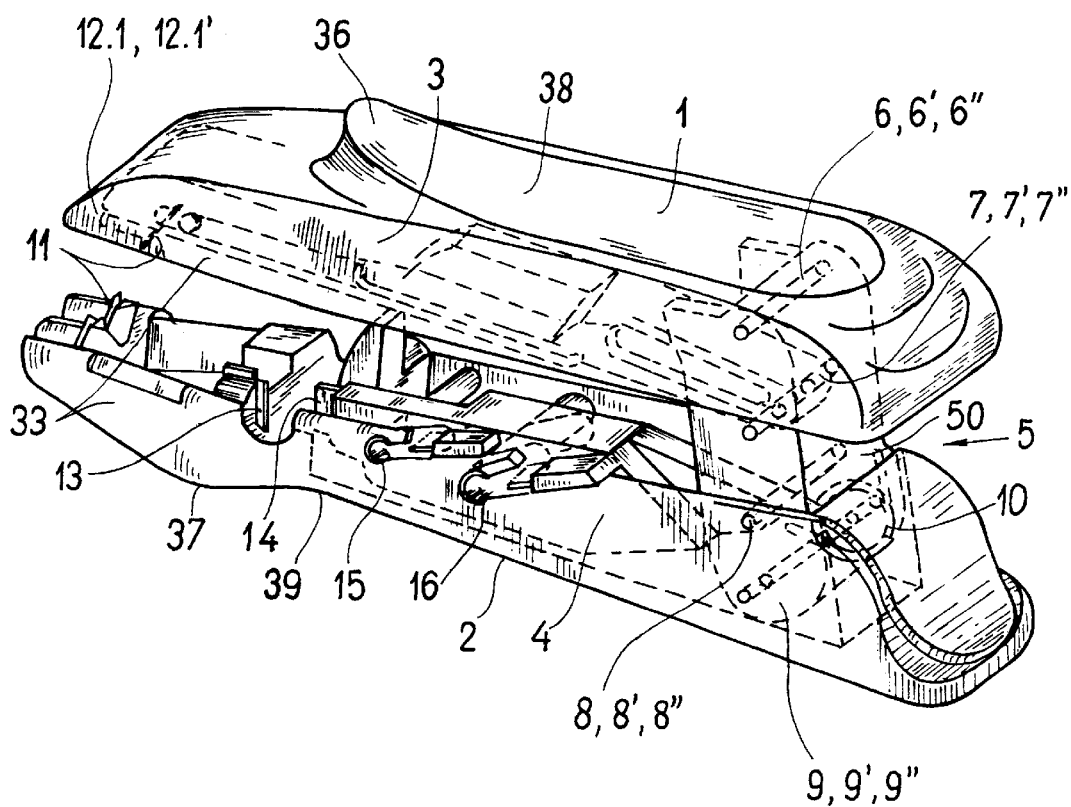
FIG. 1 is a schematic perspective illustration of a wire stripper with a quadruple articulation.

The wire stripper illustrated in FIG. 1 comprises two outer legs 1 and 2, an inner leg 3, an inner-leg piston 4, and a quadruple articulation 5. Quadruple articulation 5 is designed with an intermediate component 50 articulatedly accommodating outer leg 1 in a bearing 6, inner leg 3 in a bearing 7, inner-leg piston 4 in a bearing 8, and outer leg 2 in a bearing 9.

A spring 10 inserted in intermediate component 50 rests against the inner surface of outer leg 2 to secure components 1 through 4 in their tweezers-like disengaged position. Outer legs 1 and 2 are concave halves accommodating at least inner leg 3, inner-leg piston 4, and quadruple articulation 5.

Figure 2:
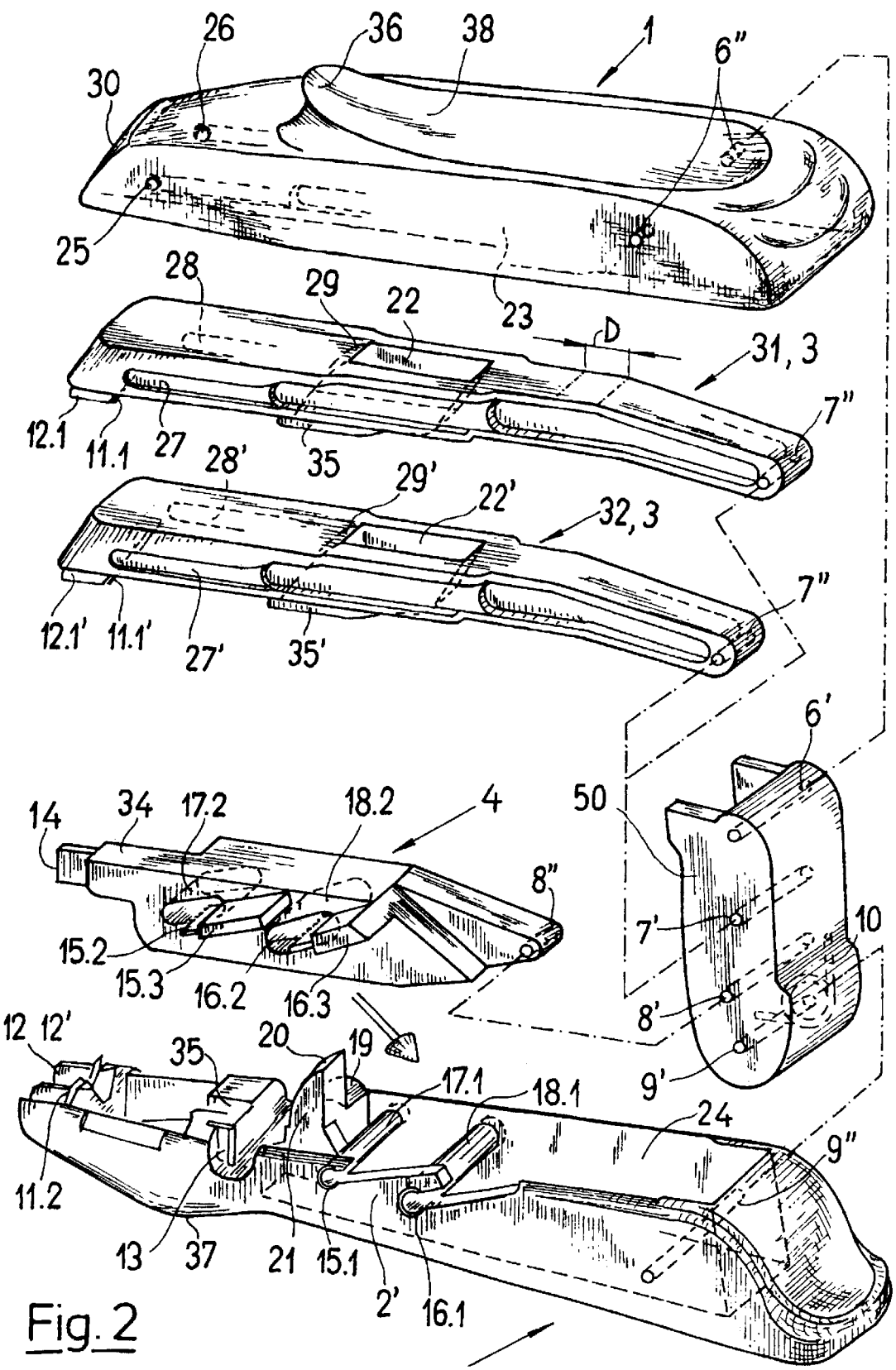
FIG. 2 is a schematic perspective illustration of the wire stripper illustrated in FIG. 1 disassembled and exploded.
Figure 3:
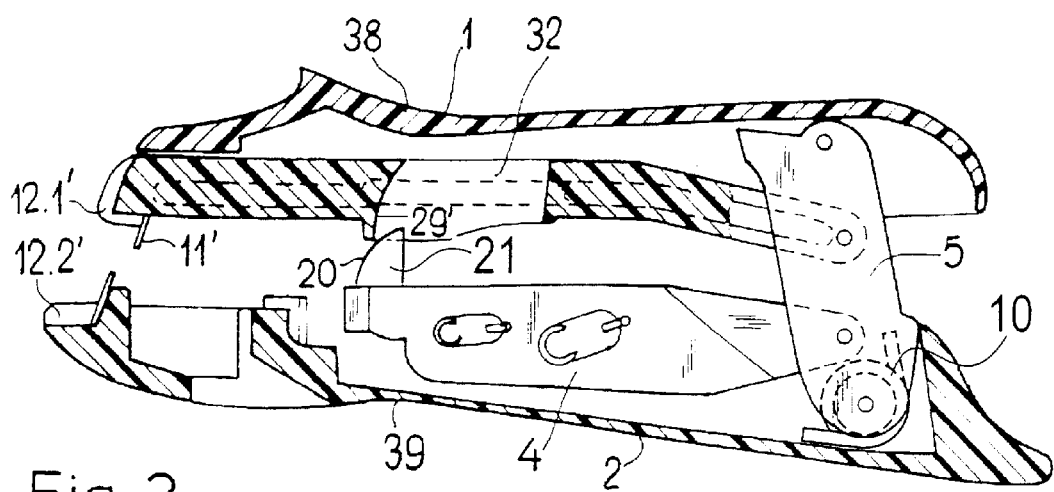
FIGS. 3 through 5 illustrate the wire stripper illustrated in FIG. 1 at various stages of operation.
Figure 4:
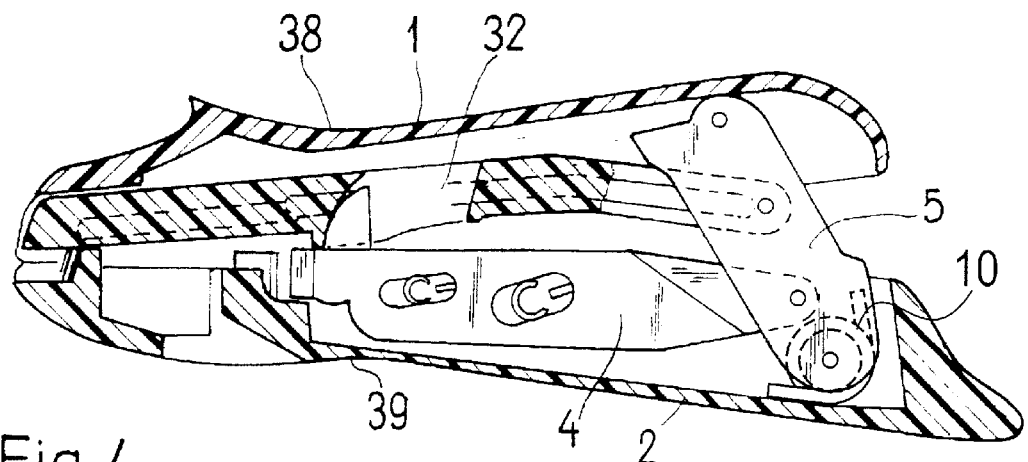
Figure 5:
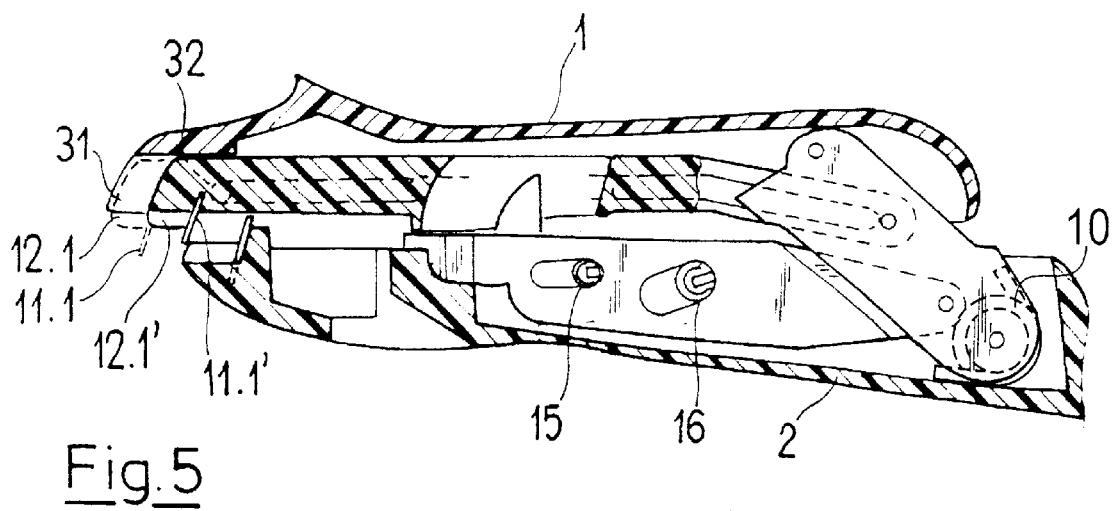

The aforesaid individual components of the wire stripper will now be specified with reference to FIG. 2.

Outer leg 1 is, as specified hereintofore, at least partly concave and accommodates an outer-leg recess 23. The front of outer leg 1 is provided with an inner-leg accommodation recess 30 that matches the cross-section of inner leg 3. Behind inner-leg accommodation recess 30, at least one guidance component 25 and 26 extends into outer-leg recess 23.

The guidance component can be a web, a rail, a bolt, or a similar structure. Mounted on the forwardmost third of its outer surface is a gripping elevation 36 with a gripping depression 38 sloping gently away from the front of it. Gripping elevation 36 and gripping depression 38 facilitate operation of the wire stripper. Facing each other in the wall of the rear of outer leg 1 are two bores 6" for accommodating bearing 6.

Illustrated below outer leg 1 are two different embodiments of inner leg 3, one of them in the form of an insulation-removal leg 31 and the other in that of an insulation slide-off leg 32.

The front of each leg 31 and 32 is provided with a wire-cutting component 11.1 and 11.1'. In front of each component 11.1 and 11.1' is a gripping jaw 12.1 and 12.1'. Behind each component 11.1 and 11.1' and within each leg 31 or 32 is at least one guidance recess 27 and 28 or 27' and 28' in the form of a longitudinal groove. The guidance components 25 and 26 in outer leg 1 engage and guide recesses 27 and 28 or 27' and 28'. The particular inner leg 3 in outer leg 1 is accordingly secured and guided. Approximately half-way along each leg 31 and 32 is a leg-guidance recess 22 and 22'. A bore 7" that accommodates bearing 7 extends through the end of each leg 31 and 32. Legs 31 and 32 at least to some extent match the recess 23 in outer leg 1.

With respect to design and shape, accordingly, insulation-removal leg 31 is similar to insulation slide-off leg 32. They differ, however, in length, with insulation-removal leg 31 being an increment D longer than insulation slide-off leg 32. The length of increment D depends on the particular application. Another difference is that the leg-guidance opposing surface 29' on insulation slide-off leg 32 is at least partly beveled or curved. The leg-guidance opposing surface 29 on insulation-removal leg 31 on the other hand has only a straight rounding off of its leg guidance recess 22.

Inner-leg piston 4 is illustrated below the two embodiments of inner leg 3. It is made of plastic and is essentially rectangular in section. Mounted in the middle are guidance recesses in the form of slanting guidance slots 17.2 and 18.2. Slanting at the same angle in the vicinity of these slots are plunger-holding components 15.3 and 16.3. Each accommodates a crimping plunger 15.2 and 16.2. At the front, the body of inner-leg piston 4 merges into a guidance piston 34. Mounted on its free end is a motion separating surface 14. Motion-separating surface 14 is of metal and can accordingly be machined. If the entire inner-leg piston 4 is made of metal in contrast to the other function-defining components of the wire stripper, motion separating surface 14 will be part of it. If inner-leg piston 4 is plastic as far as guidance piston 34, motion-separating surface 14 will be part of an inserted metal piece. Crimping plungers 15.2 and 16.2 are also metal and, if inner-leg piston 4 is metal, will be part of it. If, on the other hand, plastic is employed, the particular crimping plunger 15.2 or 16.2 will be inserted in the also plastic plunger-holding components 15.3 and 16.3. Mounted on the end of inner-leg piston 4 toward motion-separating surface 14 is a bore 8" for accommodating bearing 8.

Outer leg 2 is illustrated below inner-leg piston 4.

Outer leg 2 is also at least partly concave and has an outer-leg recess 24. Accommodated in the front of outer leg 2 is the cutter 11.2 of the wire-stripping tool 11. In front of it is a gripping jaw 12.2. The cutter of a jacket-removing tool can in particular be positioned behind cutter 11.2 as well as on the opposing outer leg 1.

A transverse web extends through outer leg 2. A separating knife 13 is accommodated in outer leg 2 behind its wall 2'. Separating knife 13 constitutes in conjunction with the motion separating surface 14 on inner-leg piston 4 a cable cutter. Approximately in the middle is a guidance inner-leg recess 35. Matching recess 35 is a guidance web 35 mounted on insulation removal leg 31 or insulation slide-off leg 32.

Behind guidance inner-leg recess 35 is a cog 21. One side of cog 21 has an at least partly curved leg-motion guidance surface 20. The leg-motion guidance surface 20 on cog 21 travels over a specially designed leg-guidance opposing surface 29 on the insulation slide-off leg. Next to cog 21 is an equally high guidance surface 19. Guidance surface 19 is slightly curved. Guidance surface 19 and guidance inner-leg recess 35 constitute part of a sliding surface as the individual legs move and hence facilitate the sliding motion of the wire stripper.

Accommodated in wall 2' behind components 19 and 21 is a sloping recess. In this vicinity, walls 2' extend between guidance rods 17.1 and 18.1. Opposing these guidance rods, inner-leg piston 4 moves in such a way that crimping plungers 15.2 and 16.2 travel over the sloping recess. Crimping plungers can enter crimping bushings 15.1 and 16.1. Crimping plungers 15.2 and 16.2 are designed with the solid guidance rods 17.1 and 18.1 bored and accordingly slotted. The advantage of this design is that the crimping bushings 15.1 and 16.1 cannot be displaced at an angle during crimping. A bore 9" for accommodating bearing 9 extends through end of outer leg 2 facing wire-cutting component 11.2. Inner-leg piston 4 can be inserted in the resulting outer-leg recess 24.

All components, except for the wire-stripping tool, 11.1, 11.2 cable cutter, 13, 14 crimping tools 15.1, 15.2, 16.1, 16.2, pin bearings 6–9, and spring 10, are plastic. The use of plastic facilitates molding the specially shaped parts of the individual legs. A specially hardened steel is used for the excepted components. The other components can made of iron, brass, copper, or even a hard plastic.

Intermediate component 50 is illustrated next to inner-leg piston 4. Bearing-accommodation bores 7", 8", and 9" extend through intermediate component 50. Spring 10 is accommodated in one wall of this component 50. The end of intermediate component 50 that can be inserted into outer leg 2 is rounded. The other end is rounded off merging into a straight surface. Outer leg 1 can rest on the straight surface. Although intermediate component 50 can be solid, the illustrated embodiment is hollow and open along one side.

How the wire stripper is assembled will now be specified. Inner leg piston 4 is inserted into lower outer leg 2. Intermediate component 50 is then inserted into recess 24 of outer leg 2 and the pin 9' is inserted into the bore 9". Inner-leg piston 4 is now connected to intermediate component 50 by inserting pin 8'0 through bore 8".

Outer leg 1 is now positioned on intermediate component 50 and connected to it by inserting pin 6 into bore 6'.

Since there are three possible embodiments of inner leg 3, the insulation-removal leg 31 in one can now be connected to intermediate component 50 by inserting pin 7 into bore 7'. If this connection is to be permanent, insulated wires can now be stripped of insulation with the wire-stripper.

Insulation slide-off leg 32 can also be connected instead of insulation-removal leg 31 to intermediate component 50 by inserting pin 7 into bore 7'. This version makes it possible in particular to prepare stranded wires for connection.

To make the wire stripper more universal in application, insulation removal leg 31 and insulation slide-off leg 32 can be alternatively connected to intermediate component 50.

How the wire stripper works will now be specified with reference to FIGS. 3 through 6.

Insulation slide-off leg 32 is employed for inner leg 3 in the wire stripper illustrated in FIG. 1. In the initial state with all the legs opposing one another like the legs of a pair of tweezers, the point of insulation slide-off leg 32 extends out of inner-leg accommodation recess 30. Wire-cutting components 11.1' and 11.2 rest parallel with their gripping jaws 12.1' and 12.2 forward.

The motion separating surface 14 of inner-leg piston 4 is separated from separating knife 13, as are crimping plungers 15.2 and 16.2 separated from the crimping bushings 15.1 and 16.1 on crimping tool 15 and 16. This state will be evident from FIG. 3.

If the adjacent legs are now squeezed together, the point of the rounded leg-motion guidance surface of cog 21 will come to rest against the appropriately prepared leg-guidance opposing surface 29'. Its sloping position and slight roundness will bring blades 11.1' and 11.2 together. Leg-motion guidance surface 20 of the cog 21 will move along leg-guidance opposing surface 29'. This operation will cut through a cylinder 41 of insulation around a stranded wire 40 while leaving the strands 42 intact.

Outer legs 1 and 2 are reliably secured in gripping depressions 38 and 39 and forced forward and toward each other by thumb pressure against gripping elevation 36. During this displacement, outer legs 1 and 2 travel farther toward each other than in relation to the insulation slide-off leg 32 and inner-leg piston between them. Since bearing 6 is farther away from bearing 9 than they are from the bearings 7 and 8 between them, the powerful sliding motion of the outer legs is transmitted with a fine touch to insulation slide-off leg 32 and inner-leg piston 4. The different paths traveled by the legs will be evident in that insulation slide-off leg 32, previously extending out of upper outer leg 1, is now entirely inside it. The sliding motion of insulation slide-off leg 32 in relation to outer leg 2 is facilitated by the friction bearing provided for the outward-facing guidance web 35' by guidance surface 19. The guidance web 35' in guidance-leg recess 35' also ensures correctly aimed forward motion on the part of insulation slide-off leg 32. Controlled displacement of insulation slide-off leg 32 in outer leg 1 is ensured by the guidance components 25 and 26 sliding in guidance recesses 27' and 28'.

Figure 6:
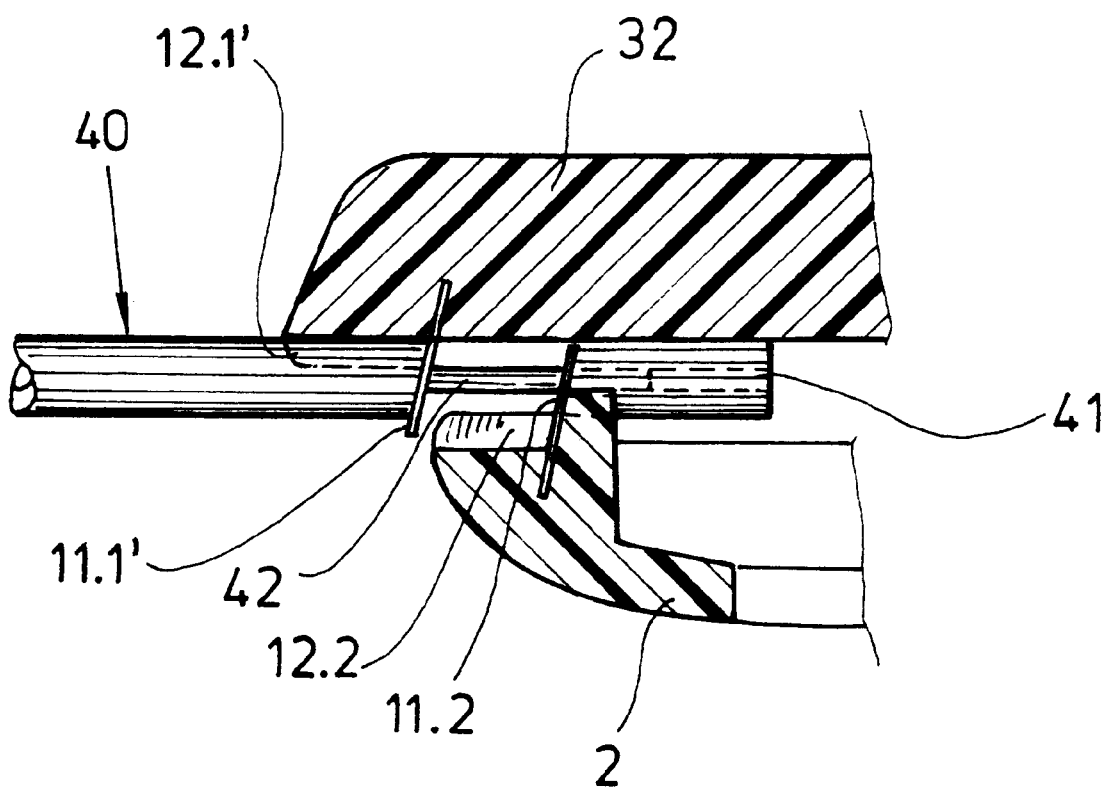
FIG. 6 illustrates a stranded wire being processed with an insulation slide-off leg.

Once the final displacement state is attained, the cylinder of insulation separated at the area of incision from the rest of the insulation is displaced as illustrated in FIG. 6 from strands 32 by a specific length determined by the distance from bearing 7 at cutter 11.1'. Since the trimmed end of cylinder 41 of insulation has not been entirely slid off strands 42, it can be exploited to twist the strands. This eliminates the often very painful twisting with the thumb and fingers. Once the strands have been twisted, the trimmed end of cylinder 41 of insulation is drawn off manually. A bushing can now be slipped over the twisted end and secured with crimping tool 15 and 16. The crimping is executed by displacement of outer legs 1 and 2. In the final state, illustrated in FIG. 5, crimping plungers 15.2 and 16.2 extend far enough into crimping bushings 15.1 and 16.1 to ensure proper crimping.

A displacement of outer legs 1 and 2 in relation to each other and hence also of inner-leg piston 4 in relation to outer leg 2 allows separating knife 13 and motion-separating surface 14 to cut through wire and cable.

If insulation-removal leg 31 is employed instead of insulation slide-off leg 32, the motion of outer legs 1 and 2 in relation to insulation-removal leg 31 and inner-leg piston 4 will occur as hereintofore specified. Since, however, insulation removal leg 31 is increment D longer than insulation slide-off leg 32, leg 31 will travel farther than lower outer leg 2. The trimmed-off cylinder 41 of insulation will be entirely removed from the strands 42 below a one-piece wire and accordingly ready to connect.

REFERENCE NUMBERS 1. outer leg
2. outer leg
2'. wall
3. inner leg
4. inner-leg piston
5. quadruple articulation
6, 7, 8, & 9. bearings 6', 7', 8', & 9'. pins
6", 7", 8", & 9". bearing bores
10. spring
11. wire-stripping tool
11.1 & 11.1'. cutter of the wire stripping tool
11.2. cutter of the wire stripping tool
12.1 & 12.1". gripping jaw
12.2. gripping jaw
13. separating knife
14. motion-separating surface
15 & 16. crimping tool
15.1 & 16.1. crimping bushing
15.2 & 16.2. crimping plunger
14.3 & 16.3. plunger-holding component
17.1 & 18.1. guidance rod
17.2 & 18.2. guidance slot
19. guidance surface
20. leg-motion guidance surface
21. cog
22 & 22'. leg-guidance recess
23 & 24. outer-leg recess
25 & 26. guidance component
27 & 27' and 28 & 28'. guidance recess
29 & 29'. leg-guidance opposing surface
30. inner-leg accommodation recess
31. insulation leg
32. insulation slide-off leg
33. jacket-removal tool
34. guidance piston
35. guidance-leg recess
35'. guidance web
36 & 37. gripping elevation
38 & 39. gripping depression
40. strands
41. cylinder of insulation
42. core
50. intermediate component
D. length increment

I claim:

1. In a device for preparing electric wires for connection comprising at least two legs fastened together at one end by a pivot, whereby the pivot comprises at least two pins accommodated in an intermediate component, the legs having at least one tool component at an other end, the improvement wherein the legs comprise two adjacent outer legs and at least one working leg disposed between the outer legs, wherein the first outer leg is secured in the intermediate component by a first pin, the second outer leg is secured in the intermediate component by a second pin, and the working leg is secured in the intermediate component by at least one more pin arranged between the first and the second pin, said intermediate component providing a multiple articulation that allows the two outer legs to be squeezed together to different extents with the working leg between them such that the tool components of the respective legs are pressed together.

2. Device as in claim 1, wherein the working leg is an inner leg.

3. Device as in claim 2, wherein the inner leg constitutes either an insulation-removal leg or an insulation slide-off leg, the insulation removal leg and the insulation slide off leg differing in length by a specific increment (D).

4. Device according to claim 3, wherein a leg guidance opposing surface of the insulation slide-off leg is at least partly arranged at a slant with respect to a central axis of the respective leg.

5. Device as in claim 1, wherein the inner leg is secured against a guidance component in the first outer leg by at least one guidance recess.

6. Device as in claim 1, wherein the tool components comprise cutters of a wire stripper, one cutter being mounted with a gripping jaw facing it on the opposing end of the inner leg, with a third pin extending through that end, and the other cutter with another gripping jaw facing it on the opposing end of the other outer leg.

7. Device as in claim 1, wherein the second leg incorporates a cog, part of which provides a curved leg-motion cam surface for coacting with another leg.

8. Device as in claim 7, wherein the cog engages a leg-guidance recess in the working leg which is arranged as an inner leg.

9. Device as in claim 1, wherein at least one of the outer legs is provided with an elevation on its outer surface to facilitate gripping by a human hand.

10. Device as in claim 1, wherein the working leg coacts with one of the outer legs in a reciprocating motion.

11. Device as in claim 10, wherein the working leg accommodates at least one crimping plunger that enters at least one crimping bushing accommodated in one wall of the second outer leg.

12. Device as in claim 11, further comprising a guidance rod that bridges outer walls of the second outer leg and extends through guidance recesses, sliding the working leg back and forth in a guidance recess therein.

13. Device as in claim 10, wherein the working leg is secured in the second outer leg by a guidance piston.

14. Device as in claim 10, further comprising a moving surface on the free end of the working leg that moves against a separating knife in one outer wall of the second leg.

* * * * *